United States Patent
Ishihara

(10) Patent No.: US 10,744,706 B2
(45) Date of Patent: Aug. 18, 2020

(54) FORMING CONTROL APPARATUS, CONTROL METHOD, AND STORAGE MEDIUM

(71) Applicant: CANON KABUSHIKI KAISHA, Tokyo (JP)

(72) Inventor: Tomohiro Ishihara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 37 days.

(21) Appl. No.: 15/912,029

(22) Filed: Mar. 5, 2018

(65) Prior Publication Data

US 2018/0264713 A1 Sep. 20, 2018

(30) Foreign Application Priority Data

Mar. 14, 2017 (JP) .................................. 2017-048935

(51) Int. Cl.
| | |
|---|---|
| B29C 64/10 | (2017.01) |
| G06F 3/12 | (2006.01) |
| G06F 3/0484 | (2013.01) |
| G06F 3/0481 | (2013.01) |
| B29C 64/20 | (2017.01) |

(52) U.S. Cl.
CPC .............. *B29C 64/10* (2017.08); *B29C 64/20* (2017.08); *G06F 3/04815* (2013.01); *G06F 3/04845* (2013.01); *G06F 3/1201* (2013.01); *G06F 3/1204* (2013.01); *G06F 3/1205* (2013.01); *G06F 3/1267* (2013.01); *G06F 3/1288* (2013.01)

(58) Field of Classification Search
None
See application file for complete search history.

(56) References Cited

U.S. PATENT DOCUMENTS

| | | | |
|---|---|---|---|
| 2012/0113457 A1* | 5/2012 | Pettis ........................ | G06F 3/12 358/1.14 |
| 2015/0197064 A1* | 7/2015 | Walker .................. | H04L 67/125 700/98 |

FOREIGN PATENT DOCUMENTS

JP          2003-044236         2/2003

* cited by examiner

*Primary Examiner* — Mohammad Ali
*Assistant Examiner* — Saad M Kabir
(74) *Attorney, Agent, or Firm* — Venable LLP

(57) ABSTRACT

A relay terminal that is connected to a forming apparatus that forms a three-dimensional object and accepts a forming request provided to the forming apparatus from a client terminal executes a process for displaying, on a display of the client terminal, a reforming UI for accepting a reforming request for a three-dimensional object that has already been formed, accepts a reforming request for the three-dimensional object that has been input on the displayed reforming UI on the display of the client terminal, executes, if a difference is present between the current setting of the forming apparatus and the setting of the forming apparatus upon the previous forming of the three-dimensional object as a target of the accepted reforming request, a process for displaying, on the display of the client terminal, a screen providing information related to the difference, and provides an instruction for reforming the three-dimensional object to the forming apparatus.

13 Claims, 18 Drawing Sheets

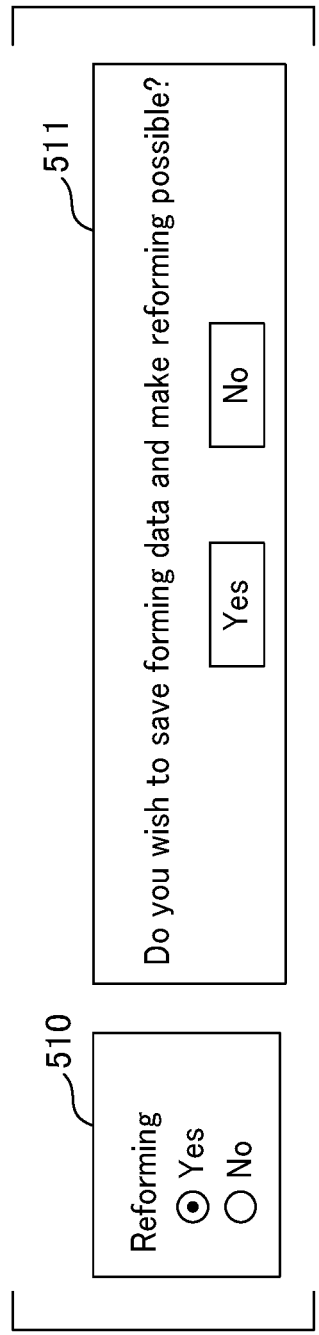
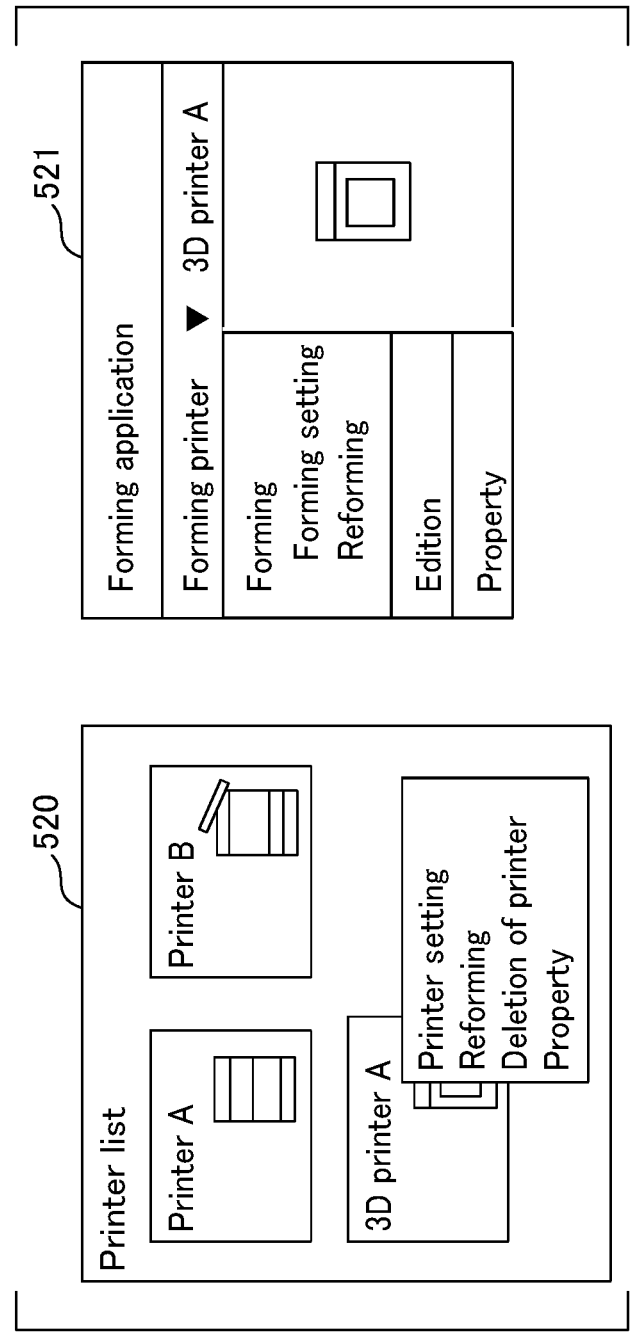

FIG. 9

| Forming data | Name | User | Date and time | Thumbnail image |
|---|---|---|---|---|
| Data A | Sample A | User P | 2016/10/11 | A.jpg |
| Data B | Bolt B | User Q | 2016/10/01 | B.jpg |
| Data C | Nat C | User P | 2016/09/20 | C.jpg |

| 1001 | 1002 | 1003 | 1004 | 1005 | 1006 | 1007 |
|---|---|---|---|---|---|---|
| Forming data | Name | User | Date and time | Thumbnail image | 3D data | Setting information |
| Data A | Sample A | User P | 2011/10/11 | A.jpg | 3DData A | PLA,100°C,... |
| Data B | Bolt B | User Q | 2011/10/01 | B.jpg | 3DData B | ABS,180°C,... |
| Data C | Nat C | User P | 2011/09/20 | C.jpg | 3DData C | ABS,200°C,... |

# FORMING CONTROL APPARATUS, CONTROL METHOD, AND STORAGE MEDIUM

BACKGROUND OF THE INVENTION

Field of the Invention

The present invention relates to a forming control apparatus, a control method, and a storage medium.

Description of the Related Art

In recent years, forming apparatuses for forming a three-dimensionally formed object (a three-dimensional object), referred to as a "3D printer", have been widely used. A user creates forming data based on three-dimensional data and setting information, and the forming apparatus forms a three-dimensional object in accordance with the forming data, by using a material (agent). There are many forming apparatuses corresponding to a plurality of materials so that it is possible to produce a three-dimensional object with various materials according to use by providing appropriate setting information to the forming apparatus.

In recent years, external terminals attached to the forming apparatuses have been developed. Normally, during forming by the forming apparatus, data related to the forming are sequentially transmitted from an information processing apparatus such as a user's PC to the forming apparatus. Since the forming apparatus and the user's information processing apparatus need to be always connected by wired or wireless connection, the user cannot leave the place during forming. For this reason, it is contemplated that, instead of the information processing apparatus, an external terminal attached to the forming apparatus receives the data related to forming from the user's information processing apparatus to sequentially transmit the data to the forming apparatus.

Japanese Patent Application Laid-Open No. 2003-44236 discloses an image processing system that, in a page printer, saves a print job, not deleting it even after output, and provides an output instruction to the saved job when output is needed again.

Since the forming apparatus is used by changing, for example, a material depending on a three-dimensional object to be formed, the state of the forming apparatus when the object has been formed the last time may be different from the current state of the forming apparatus. The state of the forming apparatus indicates, for example, a material supplied in the forming apparatus or the operation setting of the forming apparatus. In that case, reforming may fail if it is executed by using the setting at the previous forming. Additionally, some of the forming apparatuses cannot obtain the current state of the forming apparatus.

SUMMARY OF THE INVENTION

The present invention provides a forming control apparatus for executing reforming of a three-dimensional object easily and without fail, in a forming apparatus.

A forming control apparatus of one embodiment of the present invention is a forming control apparatus that is connected to a forming apparatus that forms a three-dimensional object and accepts a forming request provided to the forming apparatus from a client terminal, the forming control apparatus comprising a memory storing instructions and a processor which is capable of executing the instructions causing the forming control apparatus to: execute a process for displaying, on a display of the client terminal, a first screen for accepting a reforming request for a three-dimensional object that has already been formed; accept a reforming request for the three-dimensional object that has been input on the displayed first screen on the display of the client terminal; execute, if a difference is present between the current setting of the forming apparatus and the setting of the forming apparatus upon the previous forming of the three-dimensional object as a target of the accepted reforming request, a process for displaying, on the display of the client terminal, a second screen providing information related to the difference; and provide an instruction for reforming the three-dimensional object to the forming apparatus.

Further features of the present invention will become apparent from the following description of exemplary embodiments (with reference to the attached drawings).

BRIEF DESCRIPTION OF THE DRAWINGS

FIGS. 7A and 7B illustrate an example of a screen that accepts reforming setting and a reforming request.

FIG. 9 illustrates an example of history data according to the first embodiment.

FIG. 14 illustrates an example of history data according to the second embodiment.

DESCRIPTION OF THE EMBODIMENTS

Hereinafter, an embodiment for carrying out the present invention will be described with reference to the drawings and the like.

First Embodiment

Figure 1:
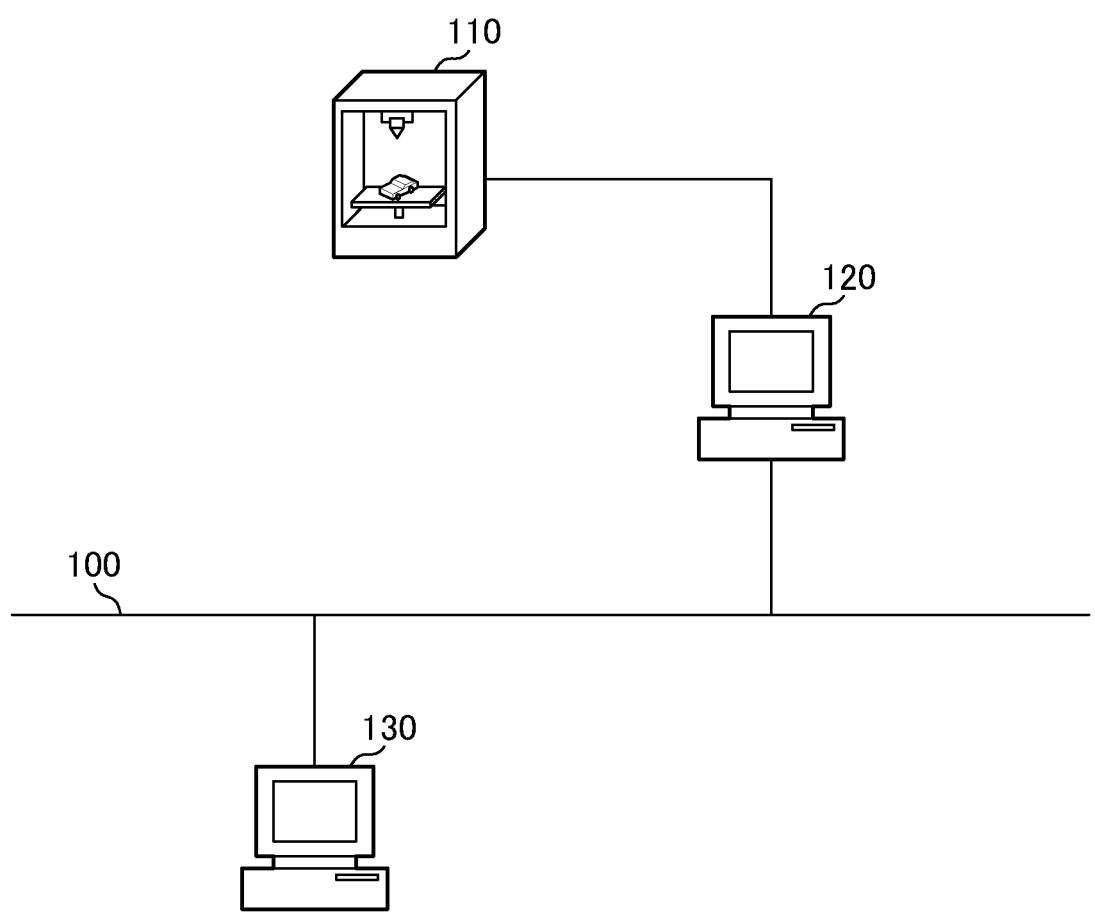
FIG. 1 illustrates an example of a configuration of a forming system according to the present embodiment.

FIG. 1 illustrates an example of a configuration of a forming system according to the present embodiment. The forming system includes a forming apparatus 110 that forms a three-dimensional object, a relay terminal 120, and a client terminal 130. The forming apparatus 110 and the relay terminal 120 are connected to each other by, for example, a Universal Serial Bus (USB) and can communicate with each other.

Additionally, the relay terminal 120 and the client terminal 130 are connected to each other via a network 100 and can communicate with each other. Specifically, the relay terminal 120 is connected to the forming apparatus 110 and functions as a forming control apparatus that accepts a forming request provided to the forming apparatus 110 from the client terminal 130. The relay terminal 120 can be configured by a single board computer typified by, for example, "Raspberry Pi (registered trademark)".

Figure 2:
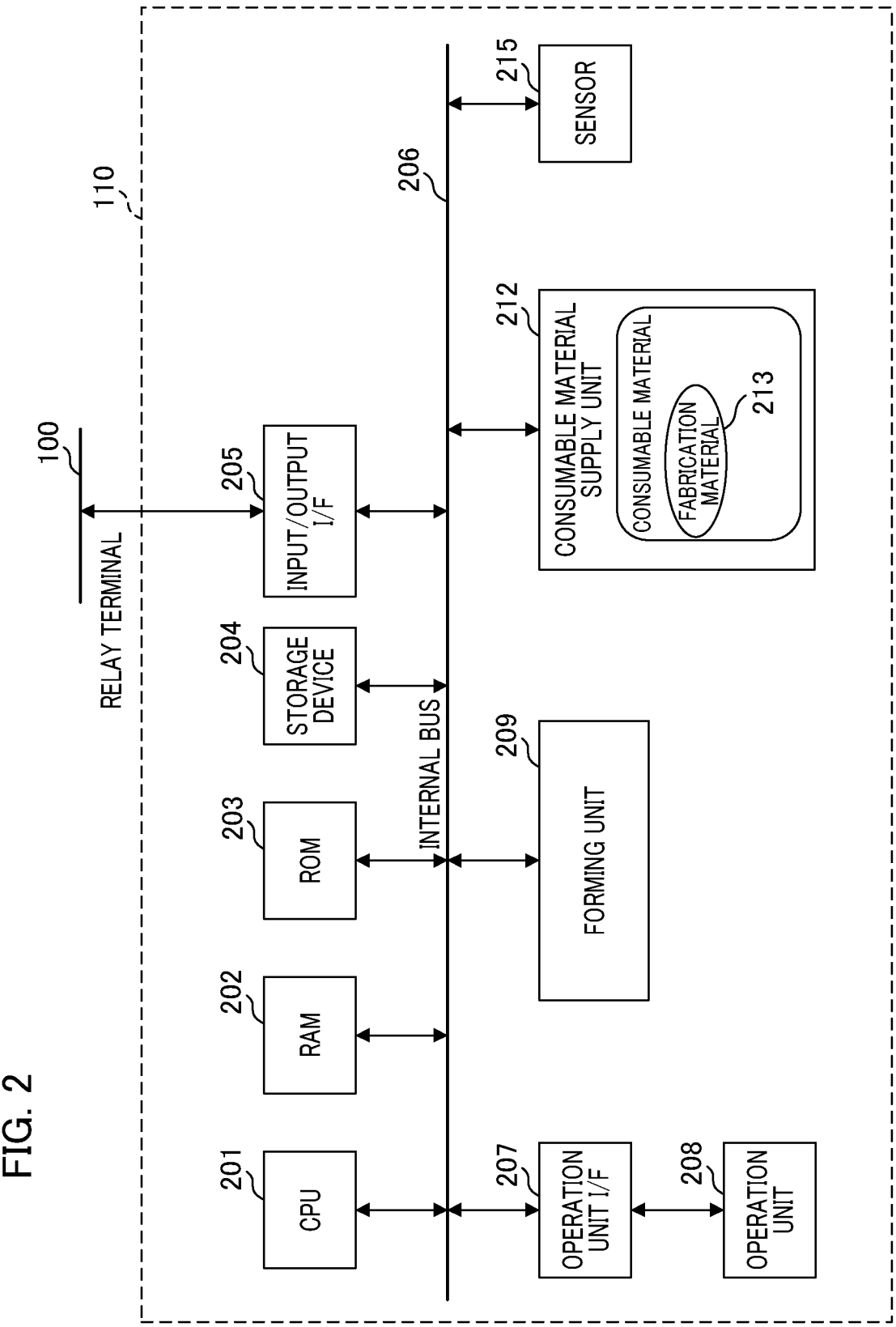
FIG. 2 illustrates an example of a hardware configuration of the forming apparatus.

FIG. 2 illustrates an example of a hardware configuration of the forming apparatus 110. In FIG. 2, although a general configuration of the forming apparatus 110 is shown as an example, some pieces of hardware shown in FIG. 2 may not be installed depending on the forming apparatus. A CPU 201 executes a program stored in a ROM 203 and a storage device 204 and controls the devices in a centralized manner via an internal bus 206. A RAM 202 functions as a memory and a working area of the CPU 201. The ROM 203 stores an embedded program and data. Additionally, the ROM 203 stores individual identification information and model information of the forming apparatus 110.

An input/output I/F 205 is used for exchanging data unidirectionally or bidirectionally with the relay terminal 120 and the like. The storage device 204 functions as an external storage device and can store, for example, various types of data related to forming. Additionally, instead of the RAM 202, the storage device 204 can store operation information and information related to consumable materials, which have been detected and recorded in the forming apparatus 110. The operation information includes, for example, failure information, status information, and log information.

An operation unit 208 supports the role of an input and an output operation in the forming apparatus 110. Specifically, the operation unit 208 accepts an input such as a button input from a user and transmits a signal corresponding to the input to each of the processing units that have been described as above through an operation unit I/F 207. Additionally, the operation unit 208 includes a display device for providing information necessary for the user and accepting a user's operation. The display device is, for example, a touch panel.

A forming unit 209 includes a specialized controller including a memory and a processor for controlling a forming process that depends on an additive manufacturing and a stage on which a material is repeatedly layered to produce a three-dimensional object. The forming unit 209 also has an equipment and a configuration dependent on the additive manufacturing for layering of a material, solidification and finishing of an object, and/or form of a support for the object.

Examples of the additive manufacturing to which the present invention can be applied include a thermal melting and stacking method known as Fused deposition modeling (FDM), Stereolithography (SLA), Selective laser sintering (SLS) and an ink jet scheme. The repeatedly layering of the material by the forming unit 209 are executed using a forming command corresponding to cross-sectional shape data of each layer (slice data) generated from three-dimensional data (model data) or the like by a 3D print application installed in the client terminal 130.

A consumable material supply unit 212 supplies a consumable material including a fabrication material (material) 213, which is necessary for forming a three-dimensional object, to the forming unit 209. In a forming apparatus adopting the method of forming a support portion in forming the three-dimensional object, the consumable material supply unit 212 holds a support material serving as a consumable material and supplies it to the forming unit 209. There are various materials used as the fabrication material 213, for example, a photocurable resin, a thermoplastic resin, a metal powder, and a gypsum material. The photocurable resin includes a liquid resin that is cured by irradiation with, for example, ultraviolet rays.

Additionally, the consumable material supply unit 212 can manage a supply amount of the fabrication material 213 and the support material to the forming unit 209. The supply amount is recorded in the storage device 204 as a log. The log to be recorded is the supply amount for each three-dimensional object (one job) for one record. Note that, in a recoding log, other than the recording of the supply amount of each three-dimensional object, the recording of the supply amount for a predetermined period of time is also possible.

Additionally, if the forming apparatus 110 enables coloration forming with a plurality of colors, the consumable material supply unit 212 can supply the fabrication materials 213 with the colors to the forming unit 209 and manage the supply amounts for each color separately. Then, the storage device 204 can store the supply amounts as a log. Note that the replenishment of the consumable material to the consumable material supply unit 212 is performed by attaching a bottle containing the fabrication material 213, such as liquid or powder, to the consumable material supply unit 212. Alternatively, the consumable material may be manually supplied from, for example, a dedicated bottle to the consumable material supply unit 212.

A plurality of sensors 215 are arranged in the forming apparatus 110. Each sensor has a purpose. Some main sensors will be described below as an example of the sensors arranged in the forming apparatus 110. A sensor detects a remaining amount of the consumable material held by the consumable material supply unit 212 by detecting a supply amount of the consumable material supplied to the forming unit 209 that is managed by the consumable material supply unit 212. Additionally, a sensor that detects the attachment of the bottle containing the fabrication material 213 and detects, for example, the identification information of the bottle, may be arranged in the forming apparatus 110.

Additionally, a sensor is arranged in the forming unit 209 and detects, for example, a temperature abnormality, and a failure in the forming unit 209. Additionally, if a forming head and a stage for a forming process are present in the forming unit 209, a sensor counts the number of driving times (moving distance) of the head and stage. Although the foregoing sensors are described as an example arranged as hardware, part or all of the sensors may be replaced by software sensor(s) having equivalent detection functions.

Additionally, as an optional device, the forming apparatus 110 may include auxiliary equipment needed depending on the forming method and a peripheral device such as a camera and an IC card reader (not illustrated), which enhances the functions and mechanisms of the forming apparatus. The examples of the auxiliary equipment include a device that is required as a countermeasure taken against powder issues in the inkjet method, which is a forming method, and a cleaning device that is required in the stereolithographic (SLA) method.

Figure 3:
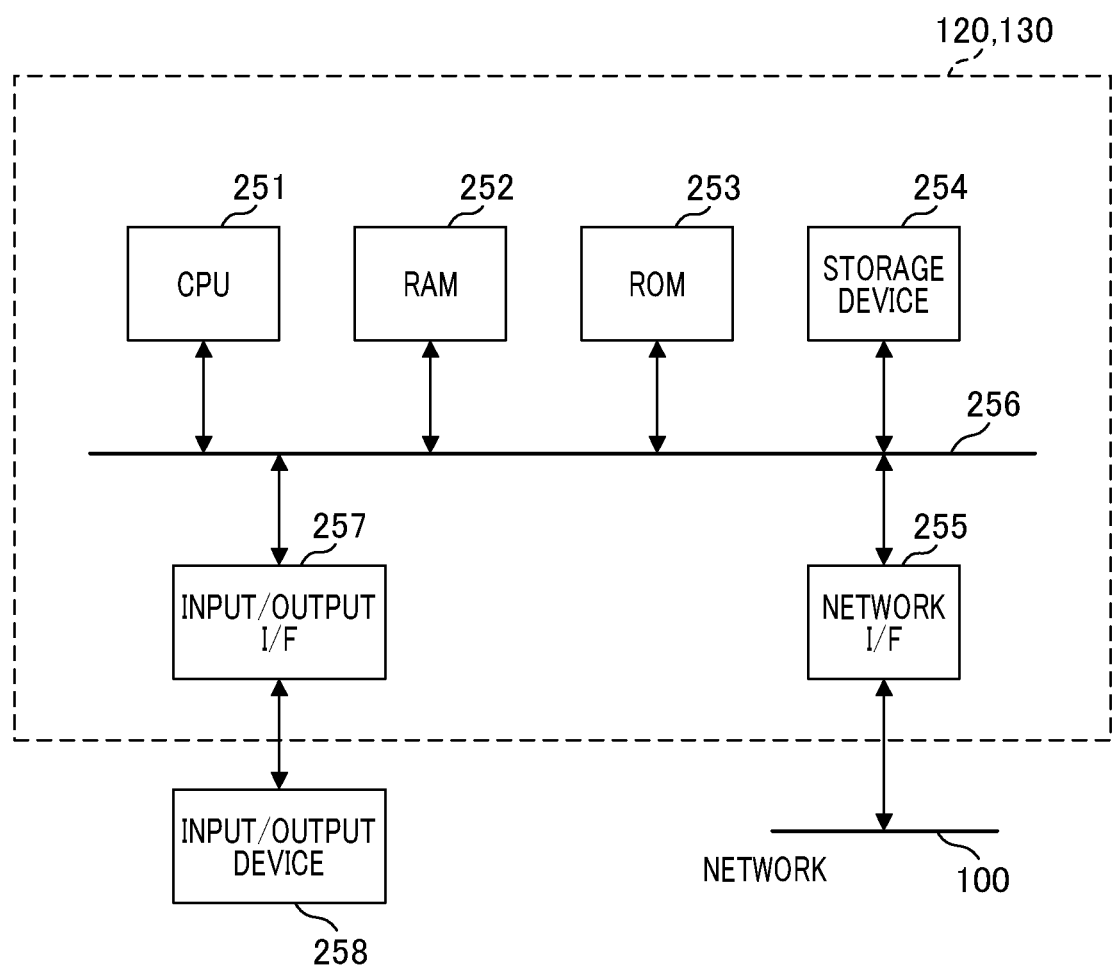
FIG. 3 illustrates an example of a hardware configuration of a relay terminal and a client terminal.

FIG. 3 illustrates an example of the hardware configuration of the information processing apparatus such as the relay terminal 120 and the client terminal 130. A CPU 251 executes a program stored in the ROM 253 and a storage device 254 to control the entire information processing apparatus via an internal bus 256. Additionally, the ROM 253 and the storage device 254 store various types of data, in addition to the program. For example, the storage device 254 stores device information, operation information, and the like of the forming apparatus 110. A RAM 252 functions as a memory and a work area of the CPU 251.

An input/output I/F 257 is, for example, a PS2, Universal Serial Bus (USB), and an analog or digital display I/F. An input/output device 258 is an input device such as a keyboard and a mouse and an output device (display unit) such as a CRT and a liquid crystal display. The input/output device 258 can be connected to the information processing apparatus via the input/output I/F 257. The information processing apparatus performs communications via the network 100 by a network I/F 255.

The ROM 253 stores an initial program for starting the information processing apparatus and a basic program for controlling each module of the information processing apparatus. The storage device 254 stores the OS and applications. When the information processing apparatus is powered on, a program (boot loader) stored in the ROM 253 for starting a computer is first executed, the OS stored in the storage device 254 is loaded into the RAM 252 by the program, and the control right is passed to the OS.

The OS reads necessary modules and driver software from the storage device 254 to the RAM 252. Additionally, the OS reads a necessary application from the storage device 254 to the RAM 252 by an instruction provided from the user and executes the application. In the present embodiment, the CPU 251 loads the program stored in the storage device 254 of the information processing apparatus into the RAM 252 and executes the program, thereby implementing each process to be described below.

Figure 4:
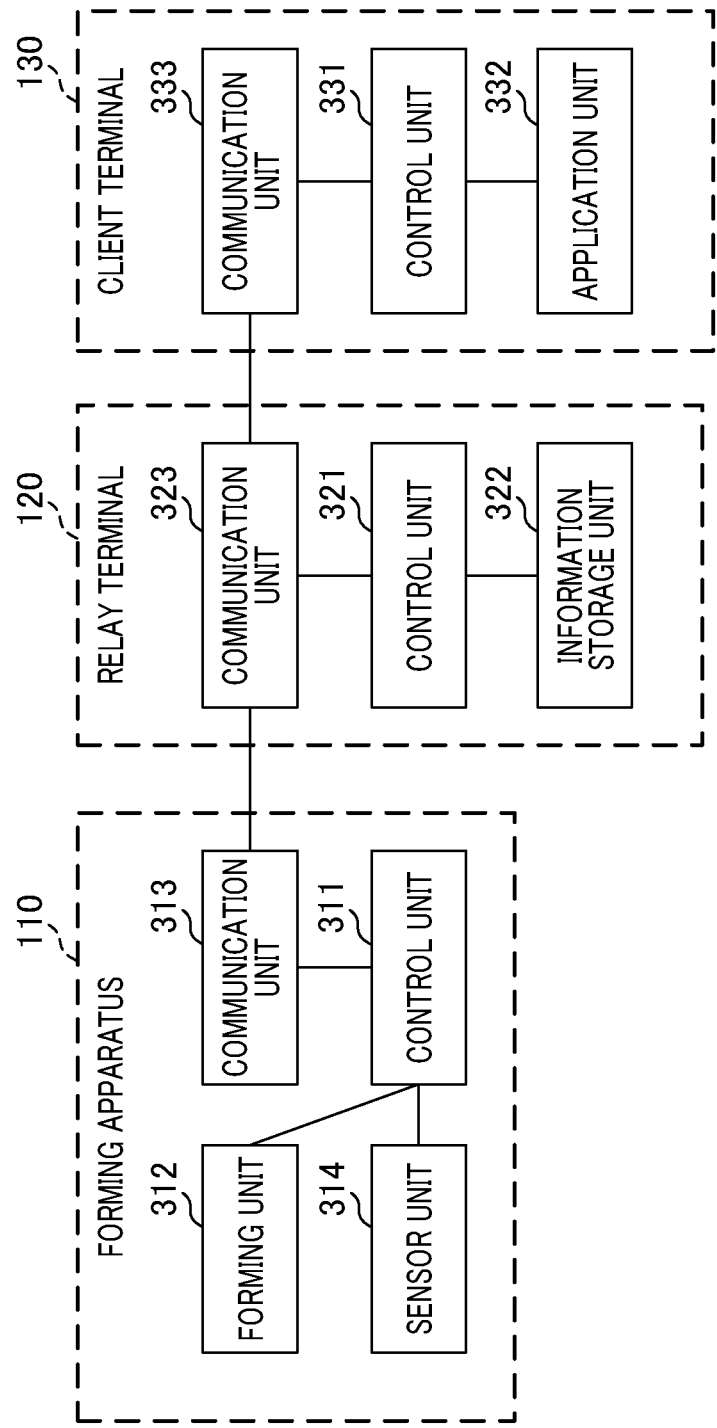
FIG. 4 illustrates an example of a software configuration of each device configuring the forming system.

FIG. 4 illustrates an example of the software configuration of each device configuring the forming system according to the present embodiment. The forming apparatus 110 includes a control unit 311, a forming unit 312, a communication unit 313, and a sensor unit 314. The control unit 311 controls cooperation between the processing units of the forming apparatus 110.

The forming unit 312 controls forming based on forming data received from the relay terminal 120. The forming data may include three-dimensional data and setting information corresponding to a three-dimensional object to be formed. The relay terminal 120 transmits the forming data in providing a forming instruction to the forming apparatus 110. The communication unit 313 is connected to the relay terminal 120 and transmits and receives forming data and sensor information. The sensor unit 314 manages, for example, hardware sensors of the forming apparatus 110, and detects the state of the forming apparatus 110.

The relay terminal 120 includes a control unit 321, an information storage unit 322, and a communication unit 323. The control unit 321 controls the cooperation between the processing units of the relay terminal 120. The control unit 321 is the subject for executing the process of the relay terminal 120 to be described below. The information storage unit 322 is a database that stores various types of data possessed by the relay terminal 120 and various types data collected from the forming apparatus 110 and the client terminal 130. The forming data related to the forming of the three-dimensional object that has already been formed and a variety of information accompanying the forming data is stored in the information storing unit 322.

Note that in the present embodiment, although the relay terminal 120 includes the information storage unit 322 in the device itself, the present invention is not limited thereto. The information storage unit 322 may be configured by a storage unit of another device. For example, the relay terminal 120 can manage the information storage unit 322 on the cloud. The communication unit 323 is connected to the forming apparatus 110 and the client terminal 130 via the USB and the network 100 to transmit and receive various types of data.

The client terminal 130 includes a control unit 331, an application unit 332, and a communication unit 333. The control unit 331 controls cooperation between the processing units of the client terminal 130. The application unit 332 generates three-dimensional data and generates forming data based on the three-dimensional data and the setting information (forming setting) indicating the setting related to forming. The communication unit 323 is connected to the relay terminal 120 via the network 100 to transmit and receive various types of data.

Figure 5:
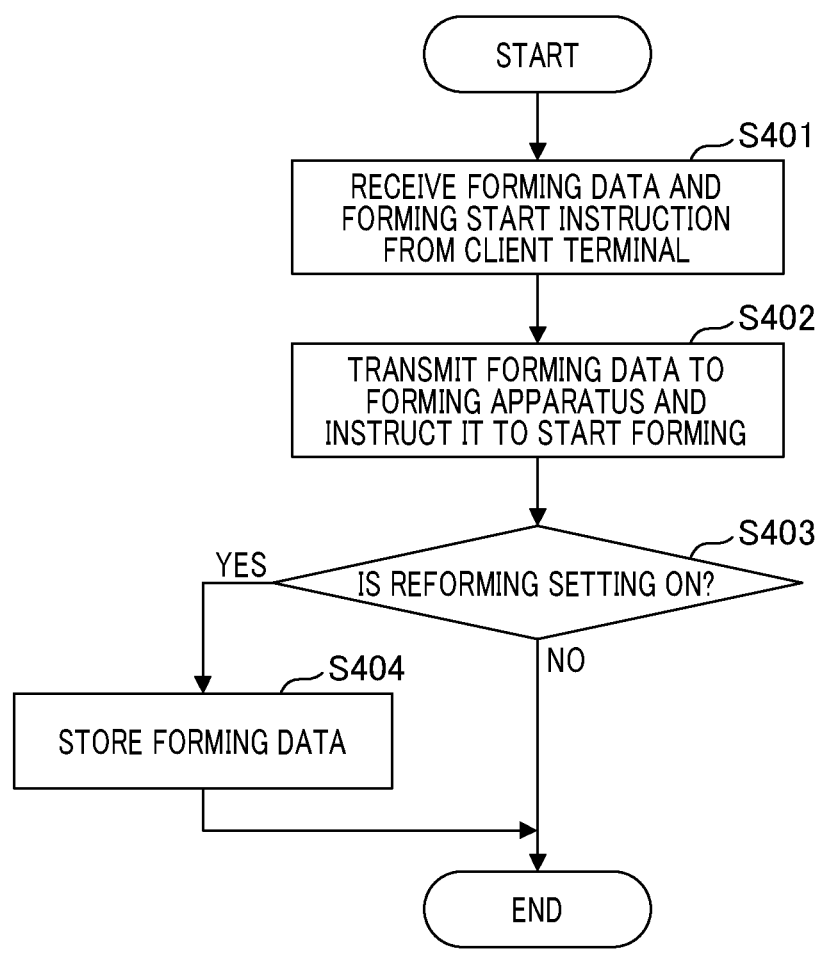
FIG. 5 illustrates a process of the relay terminal during normal forming according to a first embodiment.

FIG. 5 is a flowchart that illustrates a process of the relay terminal 120 during normal forming. In step S401, the relay terminal 120 receives forming data and a forming start instruction from the client terminal 130. In step S402, the relay terminal 120 transmits the forming data received in step S401 to the forming apparatus 110 and instructs the apparatus to start forming. In step S403, the relay terminal 120 confirms whether or not the reforming setting has been performed.

The reforming setting is a setting for storing the forming data received as a forming request from the client terminal 130 for forming the three-dimensional object, without deleting it. The reforming setting may be performed by, for example, displaying a setting screen such as a screen 510 in FIG. 7A on the client terminal 130 and having the user perform the settings in advance, or displaying a notice such as a message 511 and have the user perform the settings each time forming is executed. If the reforming setting has been performed, the process proceeds to step S404, and if not, the process ends.

In step S404, the relay terminal 120 stores the forming data that has started forming in step S402 in the information storage unit 322 as history data. Note that step S403 may be executed at any timing after the forming request is received from the client terminal 130 in step S401. Specifically, the relay terminal 120 confirms whether or not the reforming setting has been performed at any timing before instructing the forming apparatus 110 to start forming, during forming, or after the completion of forming. If the reforming setting has been performed, the process of step S404 is executed.

FIG. 9 illustrates an example of the history data according to the present embodiment. The history data is stored in a manner to link, for example, name 602 of the forming data, user 603 who has executed forming, the date and time 604 when the forming has been executed, and thumbnail image 605 to forming data 601. Additionally, the history data can be stored together with, for example, the three-dimensional data, the result of forming (success/failure), sensor conditions, and special settings. Data stored as history data is transmitted from the client terminal 130 as necessary.

Figure 6:
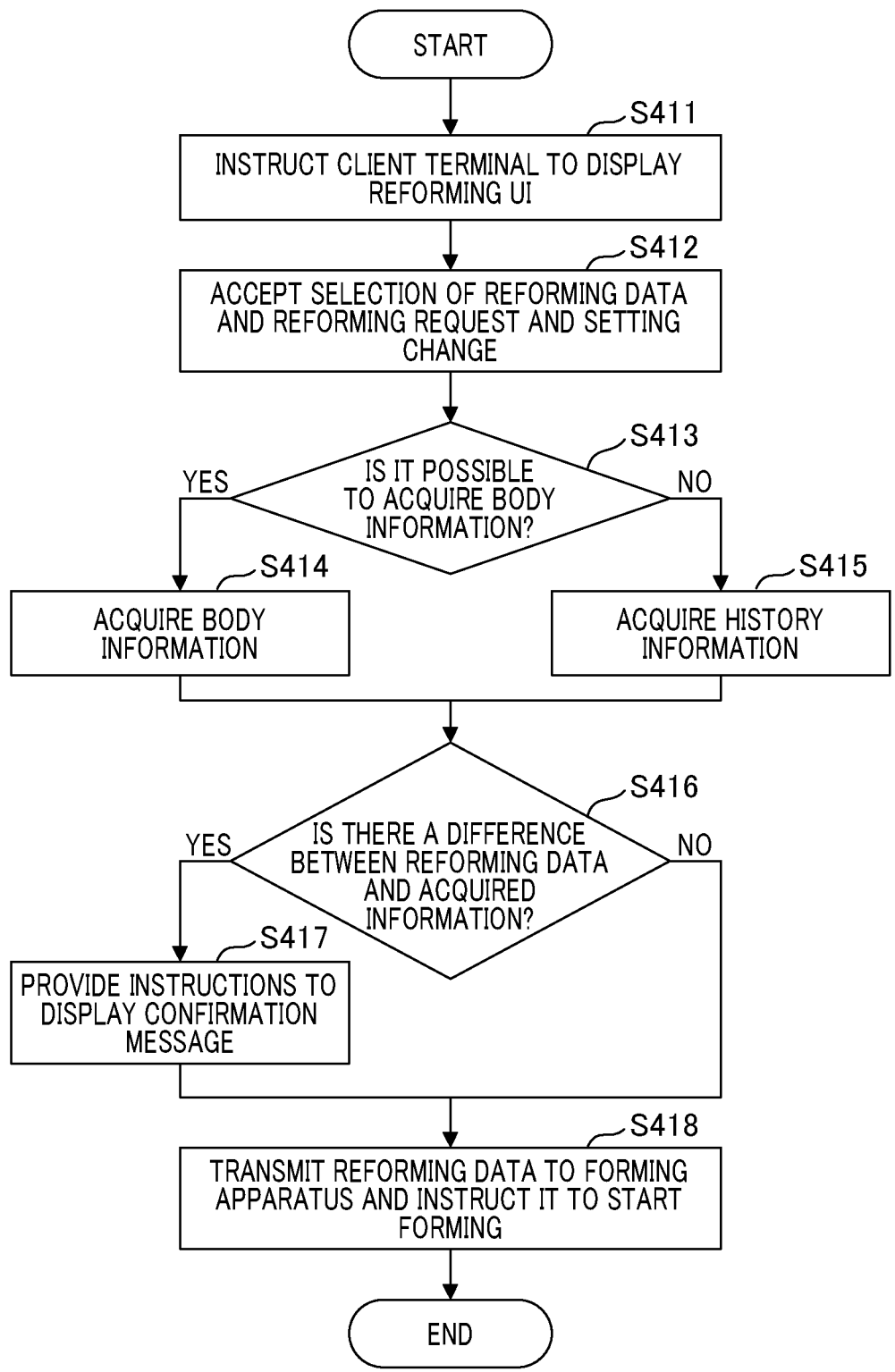
FIG. 6 illustrates a process of the relay terminal during reforming according to the first embodiment.

FIG. 6 is a flowchart that illustrates a process of the relay terminal 120 during reforming. In step S411, when the relay terminal 120 receives a reforming request from the client terminal 130, the relay terminal 120 instructs the client terminal 130 to display the reforming UI as shown in FIG.

8A. That is, the relay terminal 120 executes a process for displaying the reforming UI on the input/output device 258, which serves as the display unit of the client terminal 130. For example, the reforming request accepts a user's input from a printer selection menu 520, an application menu 521, and the like, shown in FIG. 7B, which is displayed on the client terminal 130.

Figure 8A:
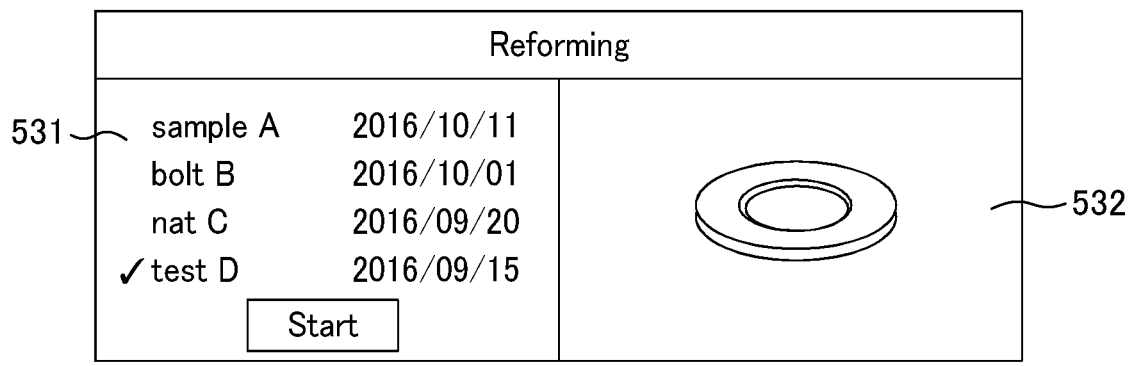
FIGS. 8A and 8B illustrate an example of a screen that accepts a reforming request, and notifies a user.

The reforming UI is a screen for accepting the reforming request for the three-dimensional object that has already been formed. For example, as shown in FIG. 8A, the reforming UI includes a list 531 of a forming history and accompanying information 532. The items of information to be displayed on the reforming UI are generated based on the history data that has been stored in step S404.

Note that the relay terminal 120 may perform display control such that, for example, the reforming UI is displayed only when the user who is currently operating the client terminal 130 matches the user 603 who has performed forming when the history data has been generated. Additionally, the relay terminal 120 may perform display control so as to change the contents to be displayed on the reforming UI depending on the user who performs forming or reforming.

In step S412, the relay terminal 120 accepts a designation of a three-dimensional object to be reformed and a reforming request from a user via the reforming UI. In step S413, the relay terminal 120 confirms whether or not the acquisition of the body information serving as the information indicating the current state of the forming apparatus 110 is possible. For example, the body information is information about a material currently supplied in the forming apparatus 110 and the current operation setting of the forming apparatus 110.

If the acquisition of the body information is possible, the process proceeds to step S414, and the relay terminal 120 acquires the body information from the forming apparatus 110. If the acquisition of the body information is impossible, the process proceeds to step S415 and the history data (FIG. 9) is acquired from the information storage unit 322 to serve as information indicating the current state of the forming apparatus 110.

Note that only the history data of the latest forming at the current point in time performed by the forming apparatus 110 may be acquired in step S415. However, as necessary, all of the history data from the previous forming of the three-dimensional objects to be reformed designated in step S412 to the latest forming thereof at that point in time may be acquired.

Additionally, the history data acquired in step S415 does not need to include information about all the items of the history data shown in FIG. 9, and instead, information about only necessary items may be acquired. Additionally, it may also be possible to acquire the history data serving as the information that indicates the current state of the forming apparatus 110 without exception, instead of determining whether or not the acquisition of the body information is possible. Specifically, the process of step S415 may be executed, instead of executing the processes of step S413 and step S414.

In step S416, the relay terminal 120 determines whether or not there is a difference between the current setting of the forming apparatus 110 and the setting of the forming apparatus 110 upon the previous forming of the three-dimensional object to be reformed designated in step S412. Note that the relay terminal 120 uses the body information acquired in step S414 or the setting of the forming apparatus 110 indicated by the history data acquired in step S415 to serve as the current setting of the forming apparatus 110.

If there is a difference in the setting, the process proceeds to step S417, and if not, the process proceeds to step S418. In step S417, the relay terminal 120 instructs the client terminal 130 to display a confirmation message urging the user to confirm the setting of the forming apparatus 110.

Figure 8B:
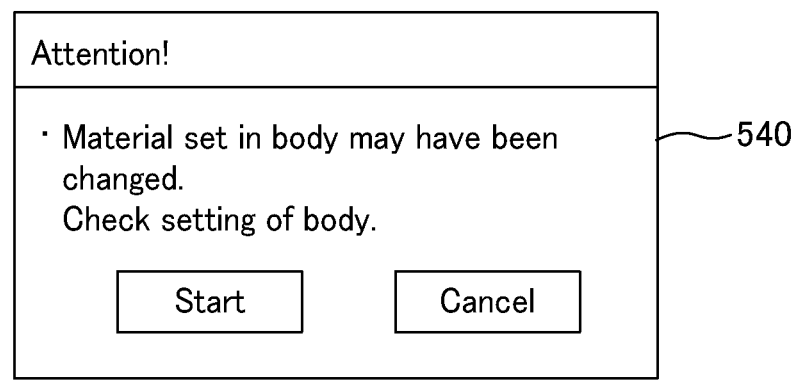

FIG. 8B illustrates an example of the confirmation message displayed by the client terminal 130. A confirmation message 540 notifies the user that the state of the forming apparatus 110 upon the previous forming of the three-dimensional object to be reformed is different from the current state of the forming apparatus 110, and urges the user to confirm it. If an operation indicating that confirmation of the user has ended has been executed by, for example, the pressing of the "START" button, the process proceeds to step S418. In step S418, the relay terminal 120 transmits the forming data 601 to be reformed that has been designated in step S412 to the forming apparatus 110 and instructs the forming apparatus 110 to start forming.

As described above, according to the relay terminal 120 of the present embodiment, it is possible to provide a mechanism for executing the reforming of three-dimensional objects easily and without fail, in consideration of the characteristics of the forming apparatus as described above.

Second Embodiment

Next, a forming system according to a second embodiment of the present invention will be described. The first embodiment has described a mechanism for urging the user to confirm the setting of the forming apparatus by displaying a confirmation message in the process during reforming (step S417).

In contrast, the present embodiment will describe a mechanism for changing the setting information for the forming to be executed instead of the setting of the body of the forming apparatus. Note that the forming system and the hardware configuration of each device configuring the forming system in the present embodiment are the same as those in the first embodiment. Accordingly, hereinafter, the same reference numerals are provided to each of the components of the same configuration, and the description thereof will be omitted.

Figure 10:
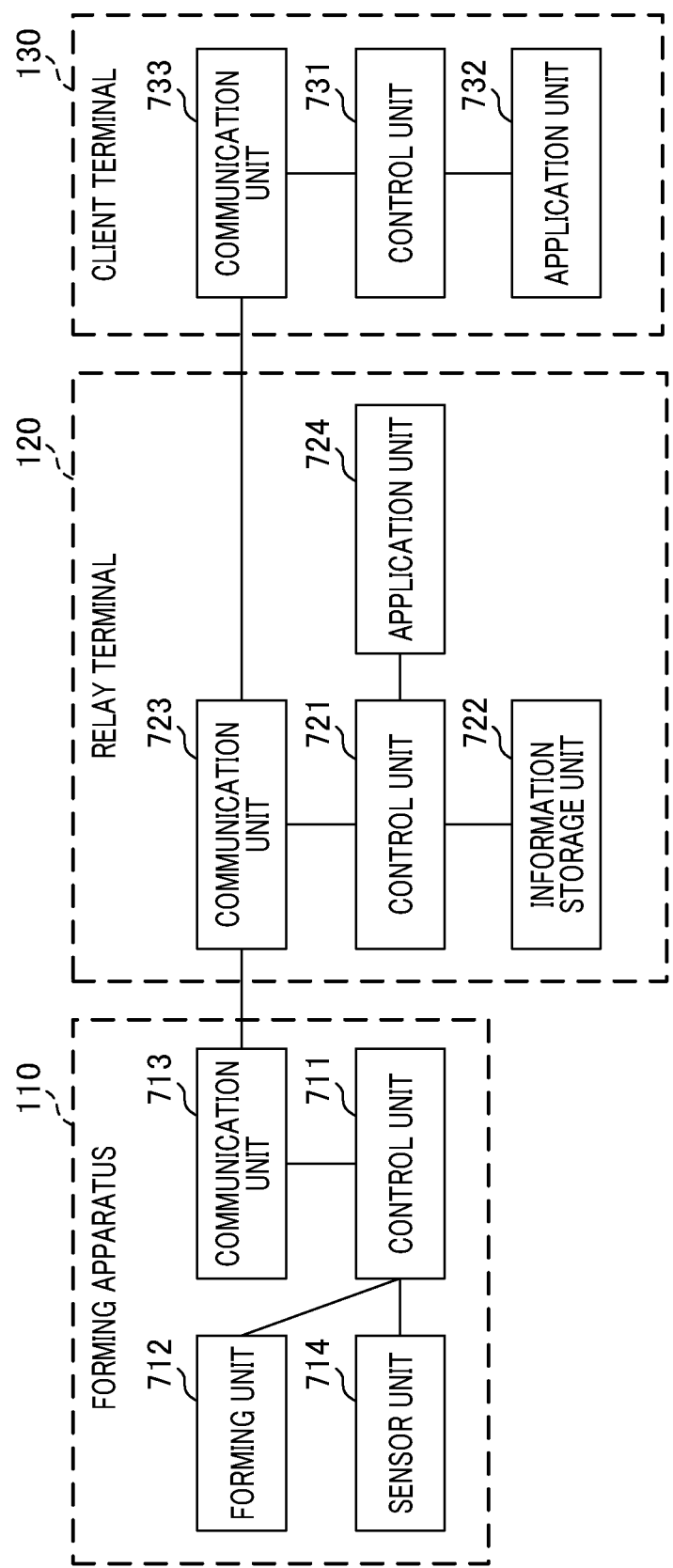
FIG. 10 illustrates an example a software configuration of each device configuring the forming system.

FIG. 10 illustrates an example of a software configuration of each device configuring the forming system according to the present embodiment. The forming apparatus 110 includes a control unit 711, a forming unit 712, a communication unit 713, and a sensor unit 714. Since each processing unit of the forming apparatus 110 has a configuration that is the same as each processing unit of the forming apparatus 110 in the first embodiment as shown in FIG. 4, the description thereof will be omitted.

The relay terminal 120 includes a control unit 721, an information storage unit 722, a communication unit 723, and an application unit 724. The control unit 721 controls the cooperation between the processing units of the relay terminal 120. The information storage unit 722 is a database that stores data possessed by the relay terminal 120 and data collected from the forming apparatus 110 and the client terminal 130. The forming data related to the forming of the three-dimensional object that has already been formed and a variety of information accompanying the forming data is stored in the information storage unit 722.

Note that in the present embodiment, the relay terminal 120 includes the information storage unit 322 in device itself. However, the present invention is not limited thereto, and the information storage unit 322 may be replaced with another storage unit of an apparatus in a manner similar to the first embodiment.

The communication unit 723 is connected to the forming apparatus 110 and the client terminal 130 via the USB and the network 100, and transmits and receives various types of data. The application unit 724 generates forming data based on the three-dimensional data and the setting information (forming setting). That is, in the present embodiment, the relay terminal 120 can receive forming data from the client terminal 130 and can also generate forming data in the apparatus itself.

The client terminal 130 includes a control unit 731, an application unit 732, and a communication unit 733. The control unit 731 controls the cooperation between the processing units of the client terminal 130. The application unit 732 generates three-dimensional data and performs settings related to forming. The communication unit 733 is connected to the relay terminal 120 via the network 100 to transmit and receive various types of data.

Figure 11:
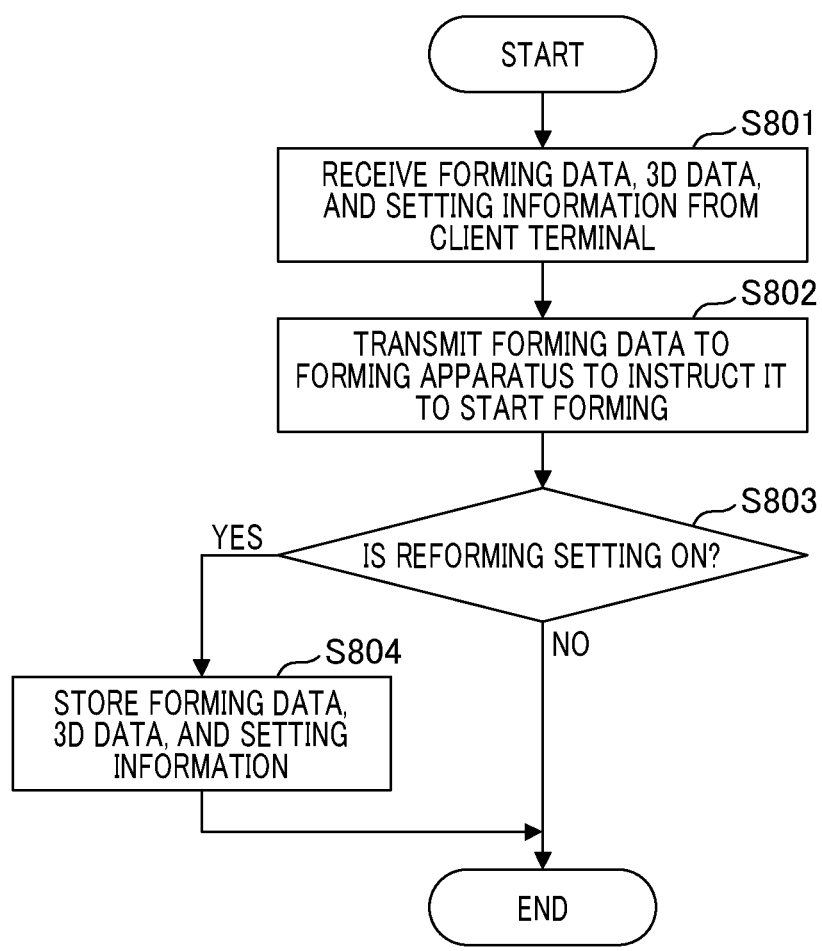
FIG. 11 illustrates a process of the relay terminal during normal forming according to a second embodiment.

FIG. 11 is a flowchart that illustrates a process of the relay terminal 120 during normal forming. In step S801, the relay terminal 120 receives forming data from the client terminal 130. At this time, the relay terminal 120 receives the three-dimensional data to be a base of the forming data and the setting information including the information about the operation setting of the forming apparatus 110. In step S802, the relay terminal 120 transmits the forming data that was received in step S801 to the forming apparatus 110 to instruct the apparatus 110 to start forming.

In step S803, the relay terminal 120 confirms whether or not the reforming setting has been performed. Note that the timing at which step S803 is executed is the same as that in the first embodiment. Additionally, in a manner similar to the first embodiment, the reforming setting may be performed by, for example, displaying a setting screen such as a screen 510 in FIG. 7A on the client terminal 130 and having the user perform the setting in advance, or displaying a notice such as a message 511, and have the user perform the setting each time forming is executed.

If the reforming setting has been performed, the process proceeds to step S804, and if not, the process ends. In step S804, the relay terminal 120 stores the three-dimensional data and the setting information corresponding to an object to be formed in the information storage unit 722, together with the forming data that that has started forming in step S802 to serve as history data.

FIG. 14 illustrates an example of the history data according to the present embodiment. The history data is stored in a manner to link, for example, name 1002 of the forming data, user 1003 who has performed forming, the date and time 1004 when the forming has been performed, thumbnail image 1005, three-dimensional data 1006, and setting information 1007 to forming data 1001. Additionally, the history data can be stored together with the results of forming (success/failure), sensor conditions, and special settings.

Note that, in the present embodiment, although, in step S801, the three-dimensional data and the setting information are received with the forming data, the present invention is not limited thereto. For example, the three-dimensional data and the setting information may be acquired in step S804. That is, the relay terminal 120 may acquire the three-dimensional data and the setting information only if the reforming setting has been performed in step S803.

Figure 12:
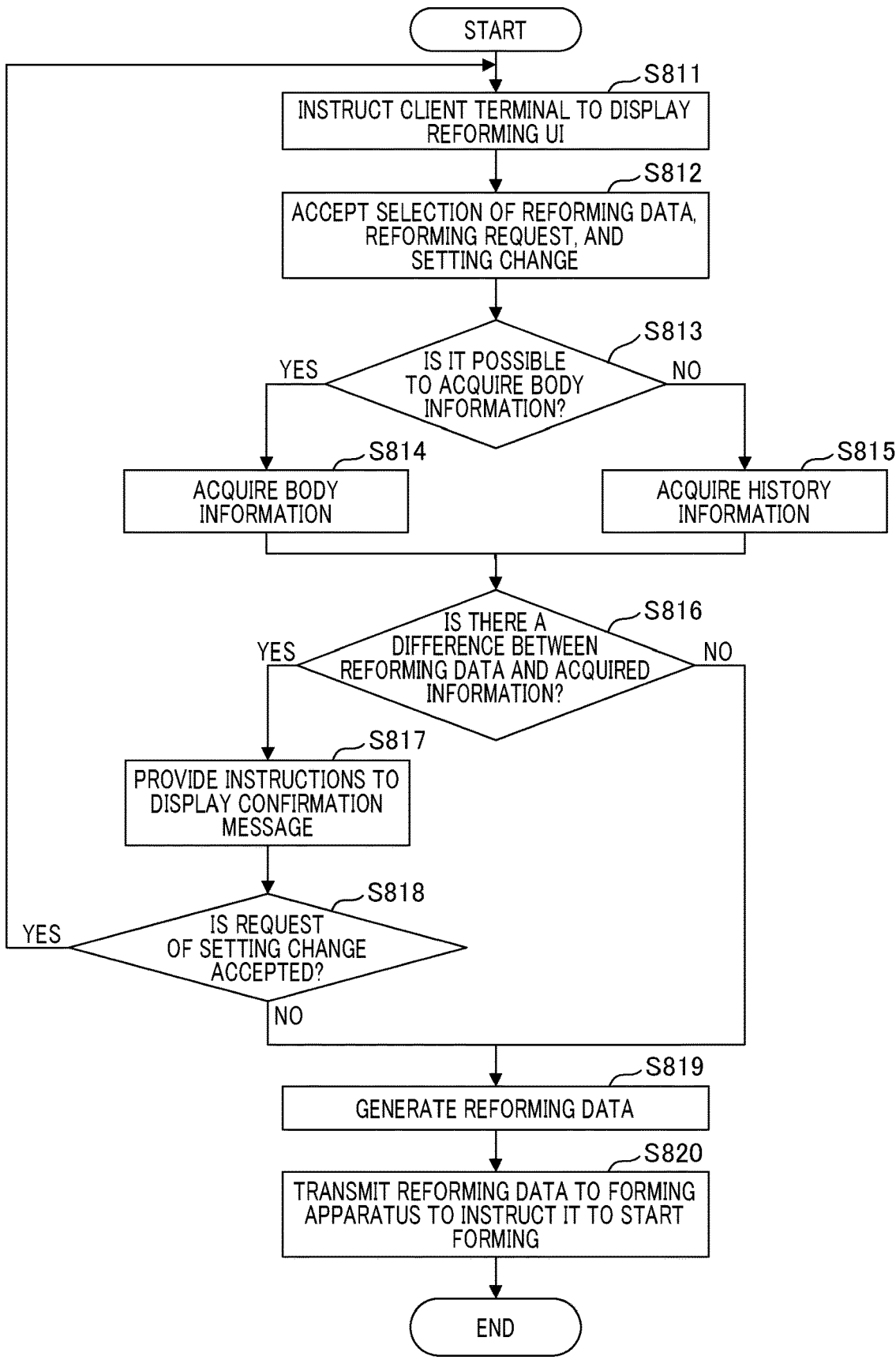
FIG. 12 illustrates a process of the relay terminal during reforming according to the second embodiment.
Figure 13A:
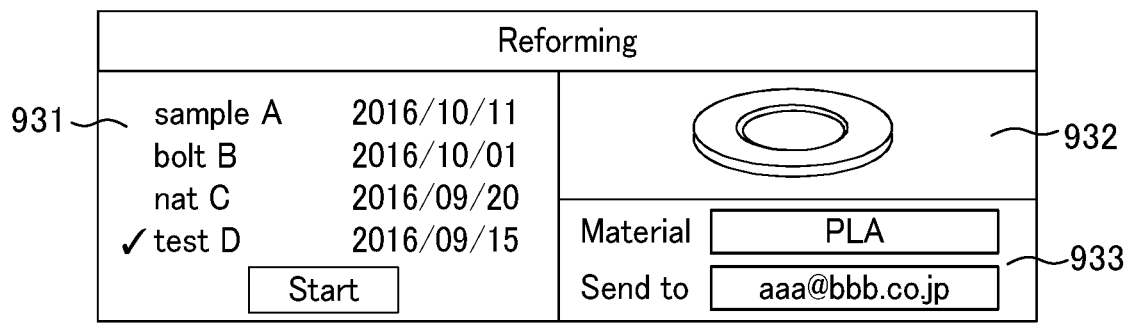
FIGS. 13A and 13B illustrate an example of a screen that accepts a reforming request and a notification to a user.

FIG. 12 is a flowchart illustrating a process of the relay terminal 120 during reforming. In step S811, if the relay terminal 120 receives a reforming request from the client terminal 130, the relay terminal 120 instructs the client terminal 130 to display the reforming UI as shown in FIG. 13A. In a manner similar to the first embodiment, for example, the reforming request is accepted by the user's input from a printer selection menu 520, an application menu 521, and the like in FIG. 7B displayed on the client terminal 130 is accepted.

As shown in FIG. 13A, the reforming UI includes a forming history list 931, accompanying information 932, and setting information 933. The setting information 933 is information to be displayed based on the setting information that has been stored in step S804, and may include information about the material supplied to the forming apparatus 110 and the operation setting of the forming apparatus 110 during forming. In the setting information 933, the setting information can be changed.

The information to be displayed on these reforming UIs is generated based on the history data that has been stored in step S804. In step S812, the relay terminal 120 accepts the designation of the three-dimensional object to be reformed, the reforming request, and setting information from the user via the reforming UI. If the setting information 933 is changed on the reforming UI, the relay terminal 120 accepts the changed setting information together with the reforming request.

In step S813, the relay terminal 120 confirms whether or not the acquisition of the body information to serve as the information indicating the current state of the forming apparatus 110 is possible. If the acquisition of the body information is possible, the process proceeds to step S814, and the relay terminal 120 acquires the body information from the forming apparatus 110. If the acquisition of the body information is impossible, the process proceeds to step S815, and the relay terminal 120 acquires the history data (FIG. 14) from the information storage unit 322 to serve as the information indicating the current state of the forming apparatus 110.

Note that the history data acquired in step S815 may be only the history data of the latest forming at the current point in time performed by the forming apparatus 110. However, as necessary, all of the history data from the previous forming of the three-dimensional objects to be reformed designated in step S812 to the latest forming thereof at that point in time may be acquired.

Additionally, the history data acquired in step S815 does not need to include information about all the items of the history data shown in FIG. 14, and, instead, information about only necessary items may be acquired. Additionally, instead of determining whether or not the acquisition of the body information is possible, it may be also possible to acquire the history data serving as the information that indicates the current state of the forming apparatus 110 without exception. Specifically, instead of executing the processes of step S813 and step S814, the process of step S815 may be executed.

In step S816, the relay terminal 120 determines whether or not there is a difference between the current setting of the forming apparatus 110 and the setting of the forming apparatus 110 upon the previous forming of the three-dimensional object to be reformed, which is designated in step S812. Note that the relay terminal 120 uses the body information acquired in step S814 or the setting of the forming apparatus 110 indicated by the history data acquired in step S815 to serve as the current setting of the forming apparatus 110.

If there is a difference in the settings, the process proceeds to step S817, and if not, the process proceeds to step S819.

Figure 13B:
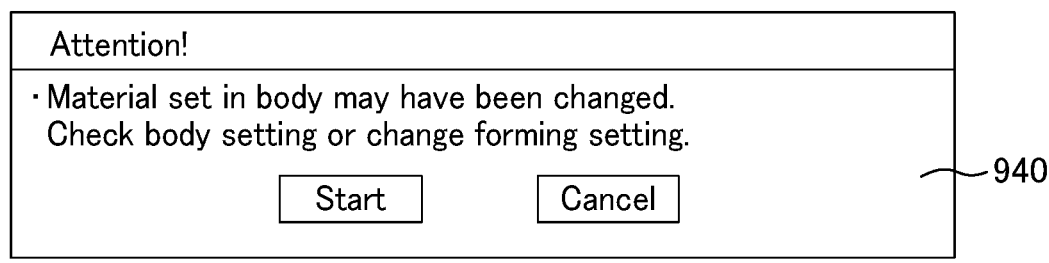

In step S817, the relay terminal 120 instructs the client terminal 130 to display a confirmation message 940 as shown in FIG. 13B. The confirmation message 940 notifies the user that the state of the forming apparatus 110 upon the previous forming of the three-dimensional object to be reformed is different from the current state of the forming apparatus 110, and urges the user to confirm this.

In step S818, it is determined whether or not the user has executed an operation for providing a request to change the setting related to forming. For example, if an operation for providing a request to execute reforming is performed after the user has completed the confirmation, for example, by the pressing of the "START" button on the confirmation message 940 by the user, the process proceeds to step S819. In contrast, if the operation for providing a request to change the setting related to forming is performed, for example, by the pressing of the "CANCEL" button by the user, the process returns to step S811. Subsequently, the relay terminal 120 instructs the client terminal 130 to display the reforming UI (FIG. 13A), and the user changes the setting information 933 of the reforming UI, thereby changing the setting related to forming.

In step S819, the relay terminal 120 generates forming data based on the three-dimensional data 1006 stored in the information storage unit 722 in step S804 and the setting information that has been changed in step S812. In step S820, the relay terminal 120 transmits the forming data generated in step S819 to the forming apparatus 110 and instructs the forming apparatus 110 to start forming.

As described above, according to the present embodiment, the effects similar to those in the first embodiment can be achieved. Furthermore, in the present embodiment, it is possible that the relay terminal 120 has the application unit 724 that generates forming data based on the three-dimensional data corresponding to the three-dimensional object and the setting information related to forming, and the setting information in the relay terminal 120 is changed during reforming.

Third Embodiment

Next, a forming system according to a third embodiment of the present invention will be described. In executing forming, there are cases in which authentication for a license for an object to be formed or authentication for certifying a user who performs a forming request are required. Additionally, a case of limiting the number of times that forming can be carried out may be assumed. In the present embodiment, a process during reforming in the case in which the authentication is required during forming will be described.

Note that the forming system, a hardware configuration, and a software configuration of the devices configuring the forming system according to the present embodiment are the same as those in the first embodiment. Accordingly, the same reference numerals are provided to each of the components of the same configurations, and the description thereof will be omitted. Note that similar to the second embodiment, in the present embodiment, the relay terminal 120 may have the application unit 724 as a software configuration.

Figure 15:
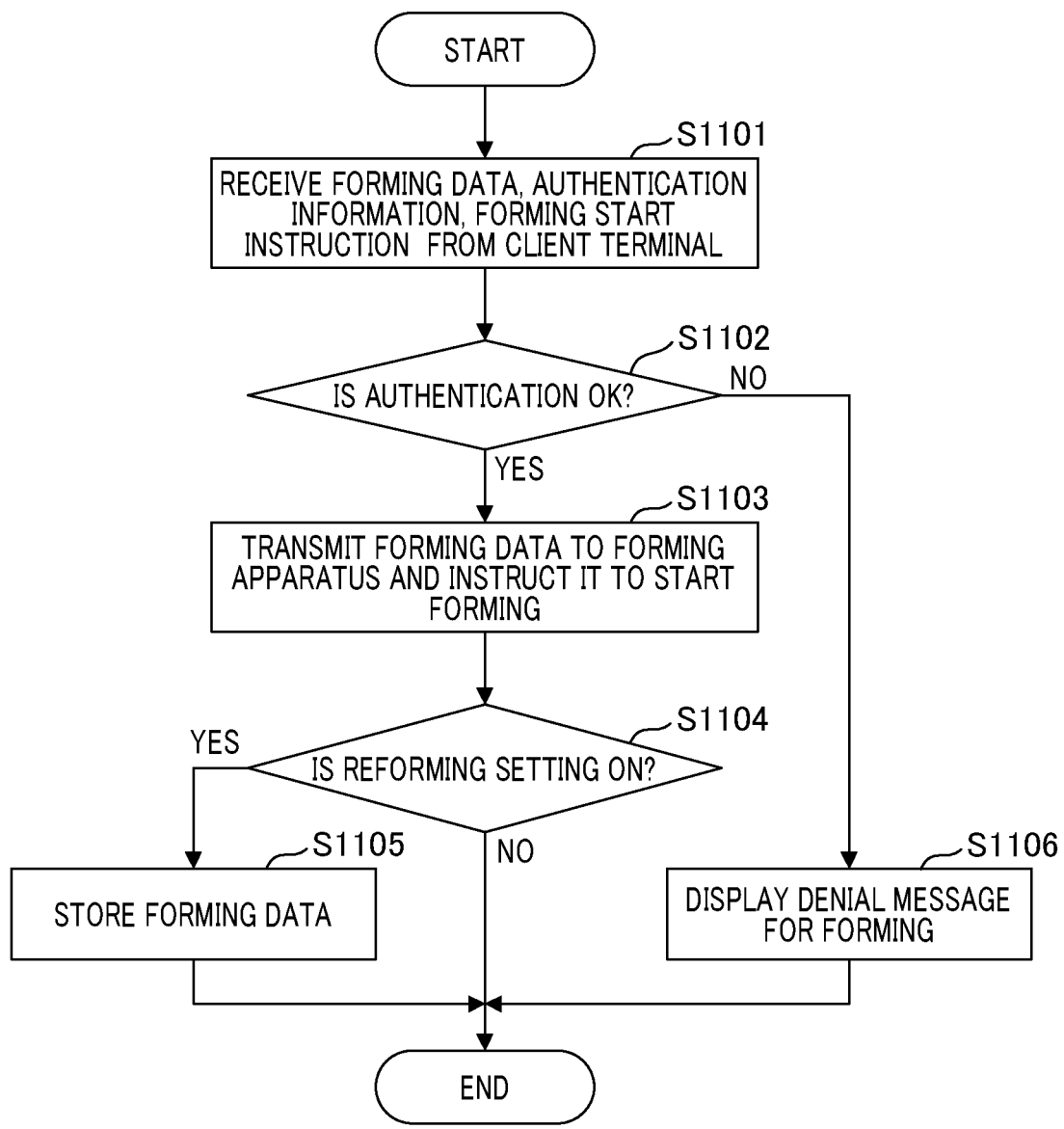
FIG. 15 illustrates a process of the relay terminal during normal forming according to a third embodiment.

FIG. 15 is a flowchart illustrating a process of the relay terminal 120 during normal forming. In step S1101, the relay terminal 120 receives forming data, authentication information, and a forming start instruction from the client terminal 130. There is a case in which the authentication information is included in the forming data. In the present embodiment, the authentication for a license for an object to be formed and the authentication for certifying a user who performs forming request are performed. The authentication information is information indicating "the authentication has been completed" or information such as a URL for authentication.

In step S1102, the relay terminal 120 confirms whether or not the authentication has been completed. If the authentication information that has been received in step S1101 is, for example, a URL, the relay terminal 120 accesses the URL to confirm whether or not the authentication has been completed. If the relay terminal 120 confirms that the authentication has been completed, the process proceeds to step S1103, and if not, the process proceeds to step S1106. In step S1103, the relay terminal 120 transmits the forming data that has been received in step S1101 to the forming apparatus 110 to instruct the forming apparatus 110 to start forming.

Steps S1104 and S1105 are similar to the processes in steps S403 and S404 in the first embodiment shown in FIG. 5, so that the description thereof will be omitted. In step S1106, the relay terminal 120 instructs the client terminal 130 to display a message indicating that forming is not being executed because the authentication related to forming has not been performed.

Figure 17:
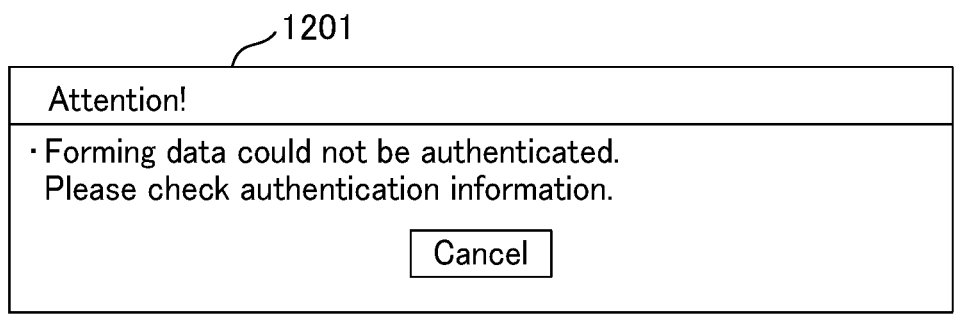
FIG. 17 illustrates an example of a notification to a user according to the third embodiment.

FIG. 17 illustrates an example of a message displayed by the client terminal 130 in step S1106. A message 1201 notifies the user, as an example, that the authentication for a license for an object to be formed has not been performed. Any message content may be used.

Figure 16:
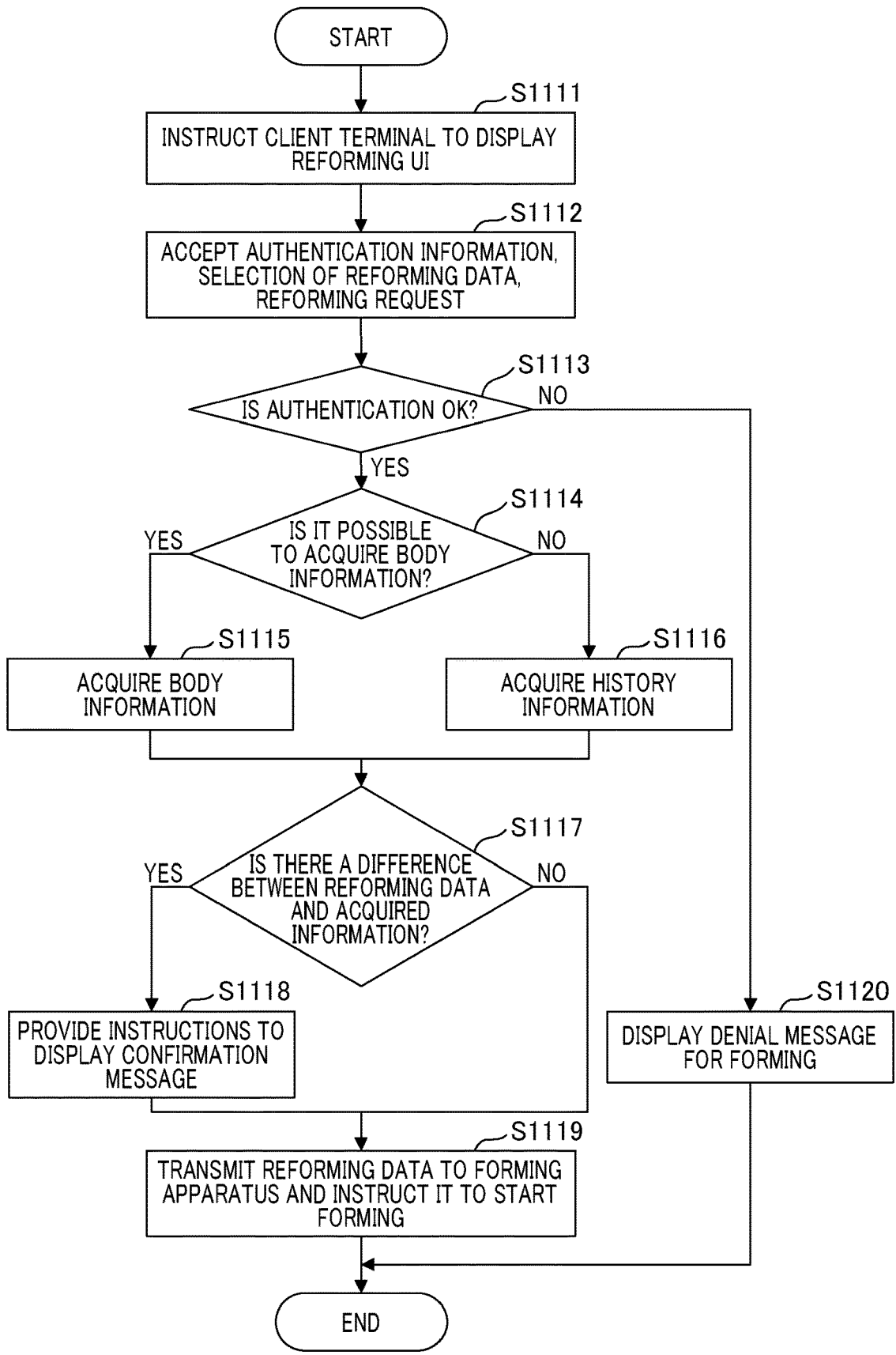
FIG. 16 illustrates a process of the relay terminal during reforming according to the third embodiment.

FIG. 16 is a flowchart for illustrating the process of the relay terminal 120 during reforming. In step S1111, if the relay terminal 120 receives a reforming request from the client terminal 130, the relay terminal 120 instructs the client terminal 130 to display the reforming UI as shown in FIG. 8A and FIG. 13A. In a manner similar to the first and second embodiments, the reforming request is accepted through various menus or the like displayed on the client terminal 130.

In step S1112, the relay terminal 120 accepts the designation of the three-dimensional object to be reformed, the authentication information, and the reforming request from the user via the reforming UI. As described above, the authentication information is information indicating the authentication has been completed or information such as URL for authentication. In step S1113, the relay terminal 120 confirms whether or not authentication has been completed. The process related to the confirmation as to whether or not the authentication has been completed is similar to the process in step S1102. If it is confirmed that the authentication has been completed, the process proceeds to step S1114, and if not, the process proceeds to step S1120.

The processes from step S1114 to step S1119 are similar to those from step S413 to step S418 in the first embodiment, so that the description thereof will be omitted. In step S1120, the relay terminal 120 instructs the client terminal 130 to display a message indicating that the reforming is not being executed because the authentication related to forming has not been performed. The message displayed here may be a message similar to that in step S1120, for example, message 1201 (FIG. 17).

Fourth Embodiment

Next, a forming system according to a fourth embodiment of the present invention will be described. In each of the above-described embodiments, in executing reforming, the data corresponding to the three-dimensional object to be reformed is selected from the list of forming history. However, finding target data from the list of the forming history is difficult in some cases. In contrast, in the present embodiment, a description will be given of a method of improving the retrievability of data when designating data corresponding to a three-dimensional object to be reformed.

Note that the forming system and the software configuration of each device configuring the forming system in the present embodiment are the same as those in the first embodiment. Accordingly, the same reference numerals are provided to each of the components of the same configuration, and the description thereof will be omitted. Note that similar to the second embodiment, in the present embodiment, the relay terminal 120 may have the application unit 724 as a software configuration.

The hardware configuration of the forming system in the present embodiment is the same as the hardware configuration (FIGS. 2 and 3) in the first embodiment. Furthermore, in the present embodiment, for example, a camera and a three-dimensional scanner are connected to the input/output device 258 (FIG. 3) of the information processing apparatus such as the relay terminal 120 or the client terminal 130 to serve as an external terminal.

Figure 18:
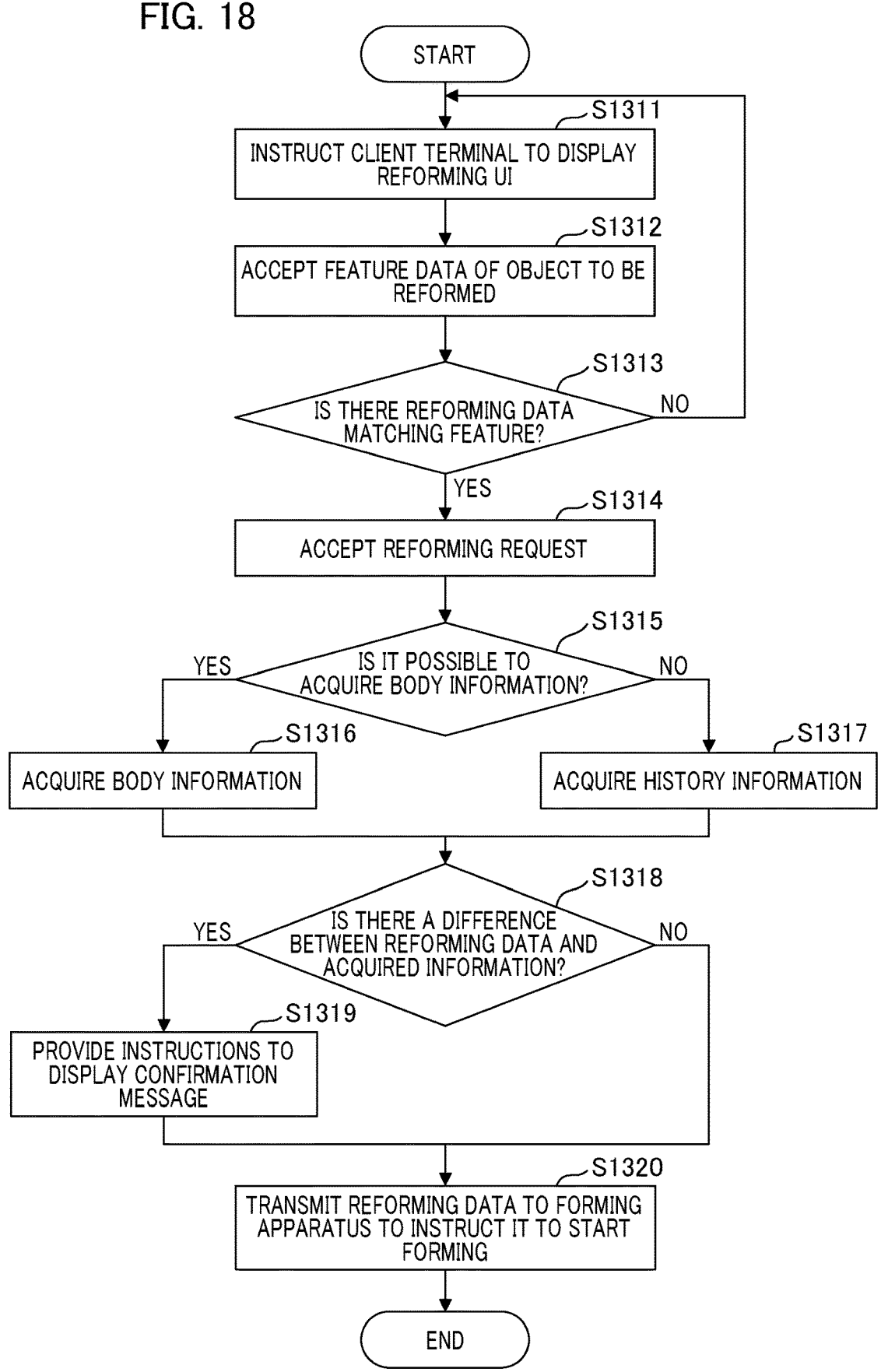
FIG. 18 illustrates a process of the relay terminal during reforming according to a fourth embodiment.

FIG. 18 is a flowchart illustrating the process of the relay terminal 120 during reforming. Note that the process of the relay terminal 120 during normal forming is similar to that in the first embodiment. In step S1311, upon the receipt of the reforming request from the client terminal 130, the relay terminal 120 instructs the client terminal 130 to display the reforming UI as shown in FIG. 8A.

In step S1312, the relay terminal 120 accepts feature data of a three-dimensional object to be reformed. The feature data is generated by an external terminal such as a camera and a three-dimensional scanner connected to the relay terminal 120 and the client terminal 130, and has the features of the three-dimensional object to be reformed.

Specifically, for example, in a camera serving as an external terminal, the feature data is image data acquired by shooting a three-dimensional object to be reformed by the camera. Additionally, for example, in a three-dimensional scanner serving as the external terminal, the feature data is three-dimensional data acquired by scanning a three-dimensional object to be reformed by the three-dimensional scanner. Additionally, the feature data is not limited to the foregoing image data and the three-dimensional data. The user creates the feature data by using the external terminal if the three-dimensional object to be reformed is at hand.

In step S1313, the relay terminal 120 determines whether or not data matching the feature data is present in the history data (FIG. 9 or FIG. 14) stored in the information storage unit 322. At this time, if the feature data is image data, the relay terminal 120 may compare the image data with the thumbnail image 605 of the history data, and if the feature data is three-dimensional data, the relay terminal 120 may compare the three-dimensional data with three-dimensional data 1006 of the history data. If the comparison between data is performed, the feature amounts are detected from each of the data.

There are various known methods for detecting the feature amounts and the present embodiment does not limit the methods. For example, there are methods using a feature point such as SIFT (Scale-Invariant Feature Transform) and SURF (Speeded Up Robust Features). There is also a method using, for example, a histogram such as HOG (Histogram of oriented gradient).

By comparing the feature amounts detected by using the foregoing method(s), the presence or absence of data matching the feature data in the history data is determined. If it is determined in step 1313 that there is no history data matching the feature data that has been received in step S1312, the process returns to step S1311 and the relay terminal 120 instructs the client terminal 130 to display the reforming UI. In this case, in a manner similar to other embodiments, the user designates a three-dimensional object to be reformed on the reforming UI.

In contrast, if it is determined in step S1313 that the history data matching the feature data is present, the process proceeds to step S1314. In step S1314, the relay terminal 120 accepts the reforming request from the user via the reforming UI. Note that, if there is a plurality of items of history data matching the feature data, the user may be allowed to select which three-dimensional object is to be reformed.

For example, it may be possible to display only a items of history data matching the feature data on the reforming UI, and have the user select an item of data. At this time, the relay terminal 120 simultaneously accepts the forming data to be reformed that has been selected by the user (history data), and the reforming request. The processes from step S1315 to step S1320 are similar to those from step S413 to step S418 in the first embodiment shown in FIG. 6, so that the description thereof will be omitted.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-048935, filed Mar. 14, 2017, which is hereby incorporated by reference wherein in its entirety.

What is claimed is:

1. A forming control apparatus that is connected to a forming apparatus that forms a three-dimensional object and accepts a forming request provided to the forming apparatus from a client terminal, the forming control apparatus comprising,
 a memory storing instructions; and
 a processor which executes the instructions causing the forming control apparatus to:
 execute a process for displaying, on a display of the client terminal, a first screen for accepting a reforming request by selecting a forming history from among one or more forming histories, wherein each of the one or more forming histories includes information related to a three-dimensional object that has previously been formed by the connected forming apparatus, wherein the information included in each of the one or more forming histories includes at least a previous setting of the connected forming apparatus upon the previous forming of the three-dimensional object;
 accept a reforming request for a three-dimensional object corresponding to a forming history that has been selected from the one or more forming histories on the displayed first screen on the display of the client terminal;
 execute, if a difference is present between a current setting of the connected forming apparatus and the previous setting of the connected forming apparatus upon the previous forming of the previously-formed three-dimensional object as a target of the accepted reforming request, a process for displaying, on the display of the client terminal, a second screen providing information related to the difference; and
 transmit an instruction for reforming the three-dimensional object corresponding to the selected forming history to the connected forming apparatus.

2. The forming control apparatus according to claim 1, wherein the forming setting indicated by history data related to the latest forming among the history data of forming executed by the forming apparatus serves as the current setting of the forming apparatus, and it is determined whether or not a difference is present between the current setting of the forming apparatus and the setting of the forming apparatus upon the previous forming of the three-dimensional object.

3. The forming control apparatus according to claim 1, wherein a setting acquired from the forming apparatus serves as the current setting of the forming apparatus, and it is determined whether or not a difference is present between the current setting of the forming apparatus and the setting of the forming apparatus upon the previous forming of the three-dimensional object.

4. The forming control apparatus according to claim 1, wherein the instructions further cause the forming control apparatus to store forming data to be transmitted in a storage device when providing an instruction for forming the three-dimensional object to the forming apparatus, in a case where the reforming of the three-dimensional object has been set if the forming of the three-dimensional object is requested by the client terminal.

5. The forming control apparatus according to claim 4, wherein the forming data of the three-dimensional object that has been requested to be formed and at least either a thumbnail image or three-dimensional data of the three-dimensional object are linked to each other and stored in the storage device.

6. The forming control apparatus according to claim 1,
 wherein, in the acceptance of the reforming request, feature data of the three-dimensional object to be reformed is accepted, and
 wherein, in the instruction for the reforming, an instruction for reforming the three-dimensional object having a feature matching the feature data is provided to the forming apparatus.

7. The forming control apparatus according to claim 6, wherein the feature data is acquired by shooting a three-dimensional object to be reformed by a camera or by scanning the object by a three-dimensional scanner.

8. The forming control apparatus according to claim 1, wherein the instructions further cause the forming control apparatus to:
 display a forming setting upon the forming of the three-dimensional object on the first screen for accepting a reforming request for the three-dimensional object that has already been formed; and
 accept a request to change the forming setting that has been input on the displayed first screen on the display of the client terminal, together with the reforming request.

9. The forming control apparatus according to claim 1, wherein the instructions further cause the forming control apparatus to perform authentication for executing forming in the forming apparatus if the reforming request for the three-dimensional object is accepted.

10. The forming control apparatus according to claim 9, wherein, in the authentication, authentication is performed by using information indicating that authentication has been completed or a URL for authentication, serving as authentication information.

11. The forming control apparatus according to claim 9, wherein, in the authentication, either authentication for a license for an object to be formed or authentication for certifying a user who has performed a forming request is performed.

12. A non-transitory storage medium on which is stored a computer program for making a computer execute a method for a forming control apparatus that is connected to a forming apparatus that forms a three-dimensional object and accepts a forming request provided to the forming apparatus from a client terminal, the method comprising:
 display-controlling that executes a process for displaying, on a display of the client terminal, a first screen for accepting a reforming request by selecting a forming history from among one or more forming histories, wherein each of the one or more forming histories includes information related to a three-dimensional object that has previously been formed by the connected forming apparatus, wherein the information included in each of the one or more forming histories includes at least a previous setting of the connected forming apparatus upon the previous forming of the three-dimensional object;
 accepting a reforming request for a three-dimensional object corresponding to a forming history that has been selected from the one or more forming histories on the displayed first screen on the display of the client terminal;
 executing, if a difference is present between a current setting of the connected forming apparatus and the previous setting of the connected forming apparatus upon the previous forming of the previously-formed three-dimensional object as a target of the accepted reforming request, a process for displaying, on the display of the client terminal, a second screen providing information related to the difference; and transmitting an instruction for reforming the three-dimensional object corresponding to the selected forming history to the connected forming apparatus.

13. A method for a forming control apparatus that is connected to a forming apparatus that forms a three-dimensional object and accepts a forming request provided to the forming apparatus from a client terminal, the method comprising:

display-controlling that executes a process for displaying, on a display of the client terminal, a first screen for accepting a reforming request by selecting a forming history, wherein each of the one or more forming histories includes information related to a three-dimensional object that has previously been formed by the connected forming apparatus, wherein the information included in each of the one or more forming histories includes at least a previous setting of the connected forming apparatus upon the previous forming of the three-dimensional object;

accepting a reforming request for a three-dimensional object corresponding to a forming history that has been selected from the one or more forming histories on the displayed first screen on the display of the client terminal;

executing, if a difference is present between a current setting of the connected forming apparatus and the previous setting of the connected forming apparatus upon the previous forming of the previously-formed three-dimensional object as a target of the accepted reforming request, a process for displaying, on the display of the client terminal, a second screen providing information related to the difference; and transmitting an instruction for reforming the three-dimensional object corresponding to the selected forming history to the connected forming apparatus.

* * * * *